(12) United States Patent
Kobayashi et al.

(10) Patent No.: US 9,678,096 B2
(45) Date of Patent: Jun. 13, 2017

(54) WHEEL SPEED SENSOR AND WIRE HARNESS

(71) Applicant: SUMITOMO WIRING SYSTEMS, LTD., Yokkaichi, Mie (JP)

(72) Inventors: Toshinari Kobayashi, Yokkaichi (JP);
Kyungwoo Kim, Yokkaichi (JP);
Hironobu Yamamoto, Yokkaichi (JP);
Moriyuki Shimizu, Yokkaichi (JP);
Tomoya Suzuki, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 21 days.

(21) Appl. No.: 14/655,585

(22) PCT Filed: Oct. 29, 2013

(86) PCT No.: PCT/JP2013/079209
§ 371 (c)(1),
(2) Date: Jun. 25, 2015

(87) PCT Pub. No.: WO2014/103499
PCT Pub. Date: Jul. 3, 2014

(65) Prior Publication Data
US 2015/0355213 A1    Dec. 10, 2015

(30) Foreign Application Priority Data

Dec. 28, 2012    (JP) ................................. 2012-288734

(51) Int. Cl.
*G01B 7/30*    (2006.01)
*G01P 1/02*    (2006.01)
(Continued)

(52) U.S. Cl.
CPC .............. *G01P 1/026* (2013.01); *G01D 5/145* (2013.01); *G01D 11/245* (2013.01); *G01P 3/44* (2013.01); *G01P 3/487* (2013.01); *H01B 7/0045* (2013.01)

(58) Field of Classification Search
CPC ...... G01D 5/145; G01D 11/245; G01V 3/165; G01R 33/0047
(Continued)

(56) References Cited

U.S. PATENT DOCUMENTS

| 4,847,557 A * | 7/1989 | Saito | G01P 1/026 174/522 |
| 5,635,678 A * | 6/1997 | Yasukuni | H02G 3/088 156/48 |
| 2008/0204007 A1* | 8/2008 | Kim | G01D 11/245 324/207.25 |

FOREIGN PATENT DOCUMENTS

| JP | 2008-241627 A | 10/2008 |
| JP | 2008-268016 A | 11/2008 |

* cited by examiner

*Primary Examiner* — Reena Aurora
(74) *Attorney, Agent, or Firm* — Oliff PLC

(57) ABSTRACT

A wheel speed sensor capable of preventing moisture from infiltrating the inside and a wire harness that is connected to the wheel speed sensor, which has a configuration in which a waterproofing member mounted on electric wires that are connected to a Hall IC and a covering member that covers the waterproofing member are embedded in an outer jacket portion. The covering member is formed of a material easily fused to the outer jacket portion. A groove is formed in the outer circumferential face of the waterproofing member, a protrusion is formed on the inner circumferential surface of the covering member, and the waterproofing member is prevented from moving in the axial direction by engaging the groove and the protrusion.

11 Claims, 11 Drawing Sheets

(51) Int. Cl.
  *H01B 7/00* (2006.01)
  *G01P 3/44* (2006.01)
  *G01D 5/14* (2006.01)
  *G01D 11/24* (2006.01)
  *G01P 3/487* (2006.01)
(58) Field of Classification Search
  USPC .................................................. 324/207.25
  See application file for complete search history.

WHEEL SPEED SENSOR AND WIRE HARNESS

TECHNICAL FIELD

The exemplary embodiment relates to a wheel speed sensor for sensing the wheel speed of a vehicle by detecting a magnetic field variation and a wire harness including the wheel speed sensor.

BACKGROUND ART

Conventionally, vehicles are fitted with wheel speed sensors, for example, for the purpose of vehicle control, such as ABS (Anti-lock Brake System) or the like. A wheel speed sensor is provided in opposition to a rotor that rotates with a wheel so as to detect the magnetic flux variation due to the rotation of the rotor and output an electrical signal corresponding to the result of the detection. A magnetoelectric transducer that converts an magnetic flux variation to an electrical signal (for example, a Hall IC (integrated circuit)) is used as the wheel speed sensor.

JP 2008-268016A proposes a wheel speed sensor in which an exposed part of the resin covering of the Hall IC is protected from damage due to impingement, adhesion, or the like of solid matter, such as iron powder. The wheel speed sensor described in JP 2008-268016A prevents damage to the resin covering of the Hall IC by securely fitting a metal cover on the resin covering.

SUMMARY

Technical Problem

A wheel speed sensor is connected to a control device, controller or the like via a wire harness disposed in the vehicle. A wheel speed sensor using a Hall IC needs to be connected to a control device, controller or the like via two signal cables, and it is often the case that these two signal wires are bundled together and covered with a synthetic resin into a single wire harness so as to be disposed in the vehicle. One end of the wire harness is stripped of the synthetic resin covering so that the two exposed signal wires are connected to the two respective metal terminals of the Hall sensor. The Hall IC, with the two signal wires connected thereto, is sealed with a synthetic resin, which forms the outer jacket of the wheel speed sensor. During the resin sealing, the synthetic resin of the wire harness that covers the two signal wires is partially embedded in the synthetic resin that forms the outer jacket of the wheel speed sensor. As this fuses the two synthetic resins together, moisture or the like is prevented from infiltrating the wheel speed sensor from where the wire harness extends out of the wheel speed sensor.

It should be noted that a fusible material is used for the synthetic resin covering that forms the outer jacket. This causes the synthetic resin sealing the Hall IC and the synthetic resin of the wire harness to fuse to each other. Meanwhile, each of the signal wires in the wire harness is individually covered with a synthetic resin material with a low fusibility.

In recent years, with the number of electronic components mounted in vehicles being on the rise, increasing numbers of electric wires, wire harnesses, and the like have also been disposed in vehicles. Accordingly, it is desirable to bundle a large number of electric wires into a single wire harness. However, if a single wire harness is formed by bundling a different electric wire to a wire harness containing two electric wires that are to be connected to a wheel speed sensor, a different electric component needs to be connected to that different electric wire. Accordingly, it is necessary to remove the synthetic resin that covers the wire harness from the vicinity of the end of the wire harness and to branch the plurality of electric wires contained in the wire harness for connection to the Hall IC and the electronic component.

In a wire harness that bundles a large number of electric wires, as the covering synthetic resin needs to be removed, it is not possible to fuse the synthetic resin that forms the outside jacket of the wheel speed sensor to the synthetic resin that covers the wire harness by resin sealing of the Hall IC. That is, it is not possible to embed the synthetic resin of the wire harness that covers the electric wires in the synthetic resin that forms the outer jacket of the wheel speed sensor, so that the above-described waterproof structure cannot be realized.

Accordingly, it is necessary to branch electric wires after removing the synthetic resin of the wire harness, bundle the branching electric wires again, cover the electric wires with a synthetic resin, and seal the electric wires and the Hall IC with resin to fuse the synthetic resin that covers the electric wires. Generally, heat-shrinkable tubing is used as a component for bundling and covering the branching electric wires. However, if heat-shrinkable tubing is fused to the synthetic resin of the synthetic resin of the wheel speed sensor, there occurs a problem of infiltration of moisture or the like into the heat-shrinkable tubing through the electric wires.

The exemplary embodiment was made based on the foregoing circumstances, and it is an object thereof to provide a wheel speed sensor capable of preventing moisture or the like from infiltrating the inside of the wheel speed sensor even if the synthetic resin of a wire harness that covers a plurality of electric wires cannot be embedded and also provide a wire harness that bundles a plurality of electric wires including those that are connected to the wheel speed sensor.

Moreover, it is an object the exemplary embodiment to provide a wheel speed sensor capable of preventing infiltration of moisture or the like along electric wires, when a plurality of electric wires included in a wire harness are branched for connection to a plurality of electronic components, including a Hall IC and the like. It is also an object to provide a wire harness that bundles a plurality of electric wires including those that are connected to the wheel speed sensor.

Solution to Problem

A wheel speed sensor according to one aspect of the present invention comprises a sensor element with a magnetoelectric transducer and terminals provided to the magnetoelectric transducer, electric wires connected to the terminals, a resin molded portion that seals the sensor element and a part of the electric wires with a synthetic resin, wherein the magnetoelectric transducer detects a change in a magnetic field due to rotation of a rotor together with a wheel, converts the change into an electrical signal and outputs the electrical signal from the terminals, characterized in that: the wheel speed sensor comprises a waterproofing member provided with through holes into which the electric wires are inserted, the waterproofing member being configured to prevent moisture from passing through the through holes when the electric wires are inserted, and that the waterproofing member is configured to be fixed to the resin molded portion by means of engagement between a hole portion formed in the waterproofing member and a part of the resin molded portion.

Moreover, the wheel speed sensor according to one aspect of the exemplary embodiment is the waterproofing member is an elastic member and that protrusions are provided in the hole portion.

Moreover, the wheel speed sensor according to one aspect of the exemplary embodiment is a cylindrical covering member that covers an outer circumferential surface of the waterproofing member.

Moreover, the wheel speed sensor according to one aspect of the exemplary embodiment is protrusions are provided on the outer circumferential surface of the waterproofing member.

A wire harness according to one aspect of the exemplary embodiment is a plurality of electric wires including the electric wires of the above-described wheel speed sensor is covered by a synthetic resin to form a single assembly.

The exemplary embodiment uses the waterproofing member, which has through holes formed therein in which the electric wires for connection with the metal terminals of the sensor element are inserted, and the waterproofing member is fixed to the resin molded portion that seals the sensor element and a part of the electrical wires with a synthetic resin so as to prevent moisture or the like from infiltrating the wheel speed sensor. The waterproofing member is capable of preventing infiltration of moisture via the through holes into which the electric wires are inserted.

Moreover, in one aspect of the exemplary embodiment, the waterproofing member is fixed by means of engagement between the hole portion formed in the waterproofing member and the resin molded portion. This facilitates the fixing of the waterproofing member.

Moreover, in one aspect of the exemplary embodiment, the waterproofing member is an elastic member, and protrusions are provided in the hole portion of the waterproofing member. This allows for bringing the protrusions in the hole portions into intimate contact with the resin molded portion fitted in the hole portion of the waterproofing member, which can prevent moisture or the like from infiltrating the inside through the hole portion and more reliably fix the waterproofing member to the resin molded portion. It should be noted that depressions, indentations, cavities, or holes that engage the protrusions of the waterproofing member may be formed in the resin molded portion.

Moreover, in one aspect of the exemplary embodiment, the outer circumferential surface of the waterproofing member is covered with a cylindrical covering member. In this way, the covering member can additionally prevent infiltration of moisture or the like. Moreover, the waterproofing member is an elastic member, and protrusions are provided on the outer circumferential surface of the waterproofing member. In this way, the protrusions on the outer circumferential surface can be brought into intimate contact with the covering member which covers the waterproofing member, making it difficult for the covering member to come off the waterproofing member. It should be noted that depressions, indentations, cavities, or holes that engage the protrusions of the waterproofing member may be formed in the inner circumferential surface of the covering member.

Moreover, in one aspect of the exemplary embodiment, a plurality of electric wires including the electric wires of the wheel speed sensor is covered by a synthetic resin to form a single wire harness. As the above-described wheel speed sensor has a waterproof structure that does not involve fusion thereof to the synthetic resin of the wire harness, the electric wires of the wheel speed sensor and other electric wires can be bundled into a single wire harness.

Advantageous Effects of the Invention

In the case of the exemplary embodiment, the cylindrical waterproofing member, in which the electric wires for connection with the sensor element are inserted, is configured to be fixed to the resin molded portion to prevent infiltration of moisture into the inside thereof, infiltration of moisture or the like along electric wires can be prevented if a plurality of electric wires in the wire harness are branched for connection.

DESCRIPTION

Embodiment 1

Figure 1:
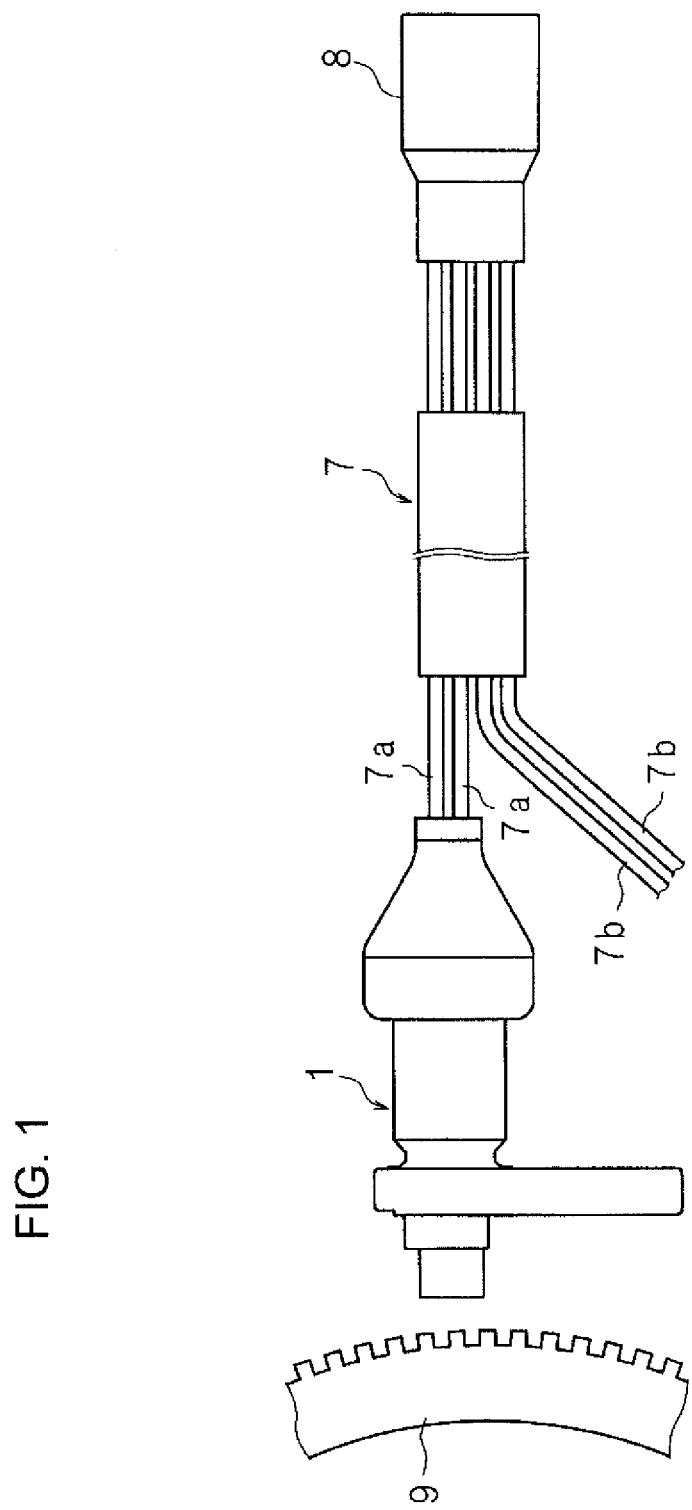
FIG. 1 is a schematic view that describes the configuration of a wire harness provided with a wheel speed sensor according to this embodiment.

The exemplary embodiment will be specifically described hereinafter with reference to the drawings. FIG. 1 is a schematic view that illustrates the configuration of a wire harness provided with a wheel speed sensor according to this embodiment. The wheel speed sensor 1 is connected to one end of the illustrated wire harness 7. The wheel speed sensor 1 is immovably secured to an appropriate location in a vehicle so as to oppose a rotor 9 that rotates integrally with a wheel of the vehicle (not shown). The wheel speed sensor 1 has an outer shape of a bar, such as a circular bar, a square bar, a rectangular bar, or a polygonal bar, and a Hall IC 20 (see FIGS. 4-6) is embedded in one end thereof with two electric wires 7a extending out of the opposite end.

The wire harness 7 is formed into a single wire by bundling two electric wires 7a to ends of which the wheel speed sensor 1 is connected and a plurality of other electric wires 7b and covering the wires with resin. The other electric wires 7b are connected to a different electronic component, a different electric wire or a different power source, disposed in the vicinity of the wheel speed sensor 1. As the different component, for example, a control device of an electrically-powered parking brake or the like may be connected to the electric wires 7b. Both ends of the wire harness 7 are stripped of the resin covering to expose the electric wires 7a and 7b. As described above, the wheel speed sensor 1 and the different electronic component, the different electric wire or the different power source, are connected to one end of the exposed electric wires 7a and 7b with a connector 8 coupled to the other end. The connector 8 is to be connected to a control unit mounted on the vehicle.

Although only a part of the rotor 9 is shown in FIG. 1, the rotor 9 actually has an annular, disc-like, or polygonal shape. The rotor 9 is magnetized so that north poles of the rotor 9 are successively alternated with south poles of the rotor 9 along the circumference. When the wheel is rotated as the vehicle travels, the rotor 9 rotates with the wheel so that the polarity of the portion of the rotor 9 opposing the wheel speed sensor 1 successively changes between a north pole and a south pole. The wheel speed sensor 1 detects the magnetic flux variation associated with this change and outputs a signal according to the detected magnetic flux to the control device, controller or the like of the vehicle connected via the wire harness 7. The control device, controller or the like of the vehicle calculates the wheel speed of the vehicle according to the output signal from the wheel speed sensor 1 to control the ABS or the like.

Figure 2:
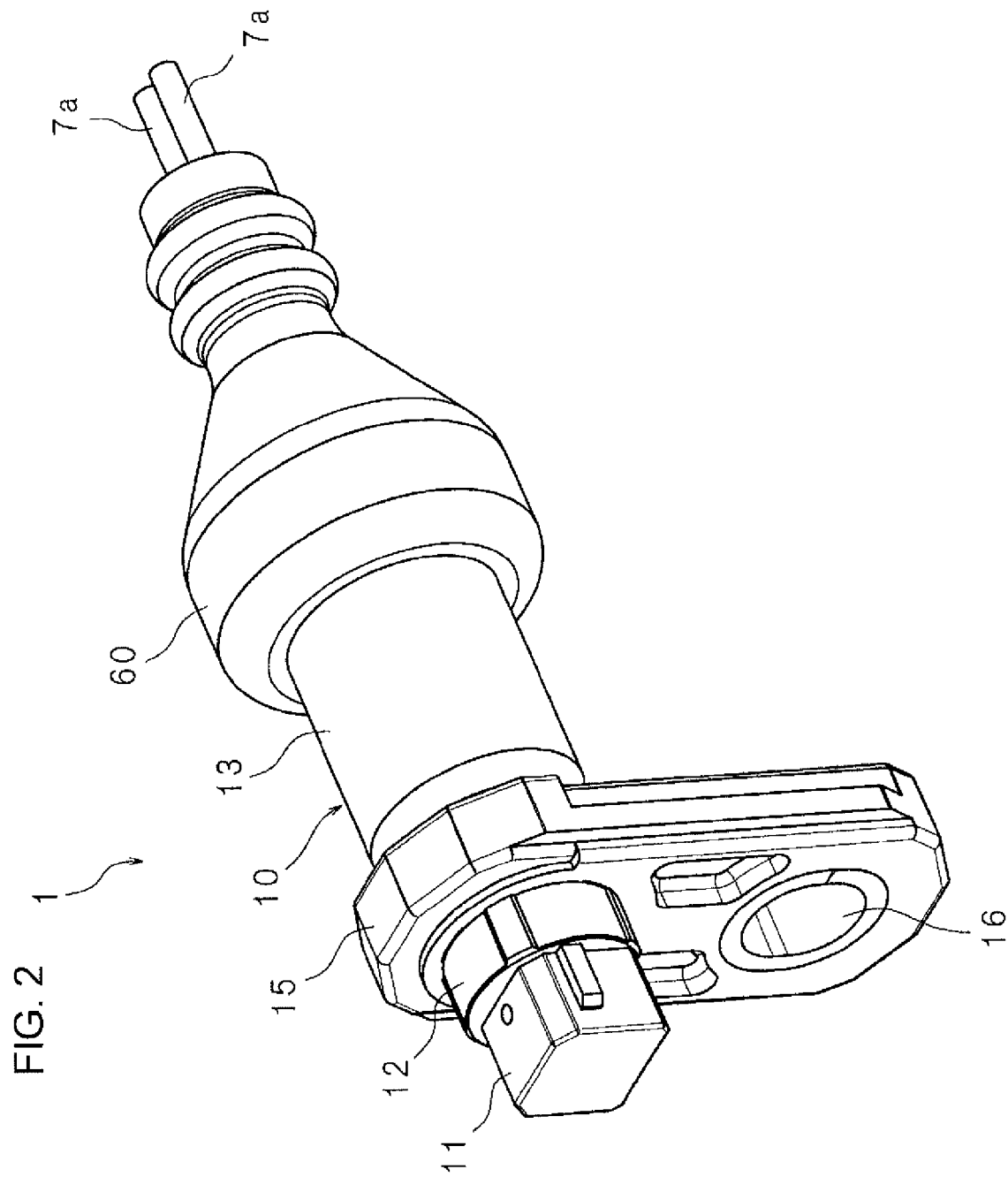
FIG. 2 is a perspective view showing the external appearance of the wheel speed sensor.
Figure 3:
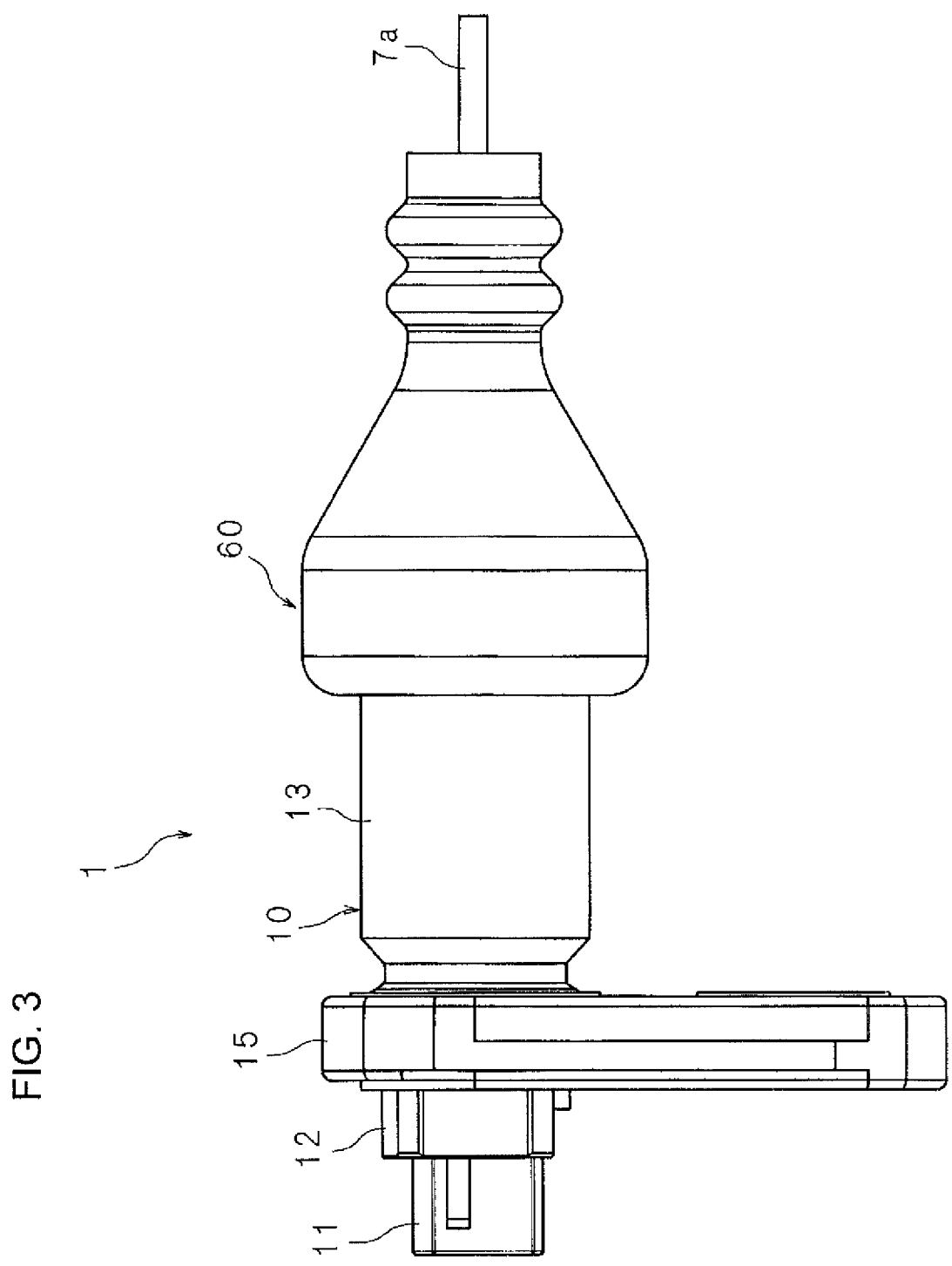
FIG. 3 is a side view showing the external appearance of the wheel speed sensor.
Figure 4:
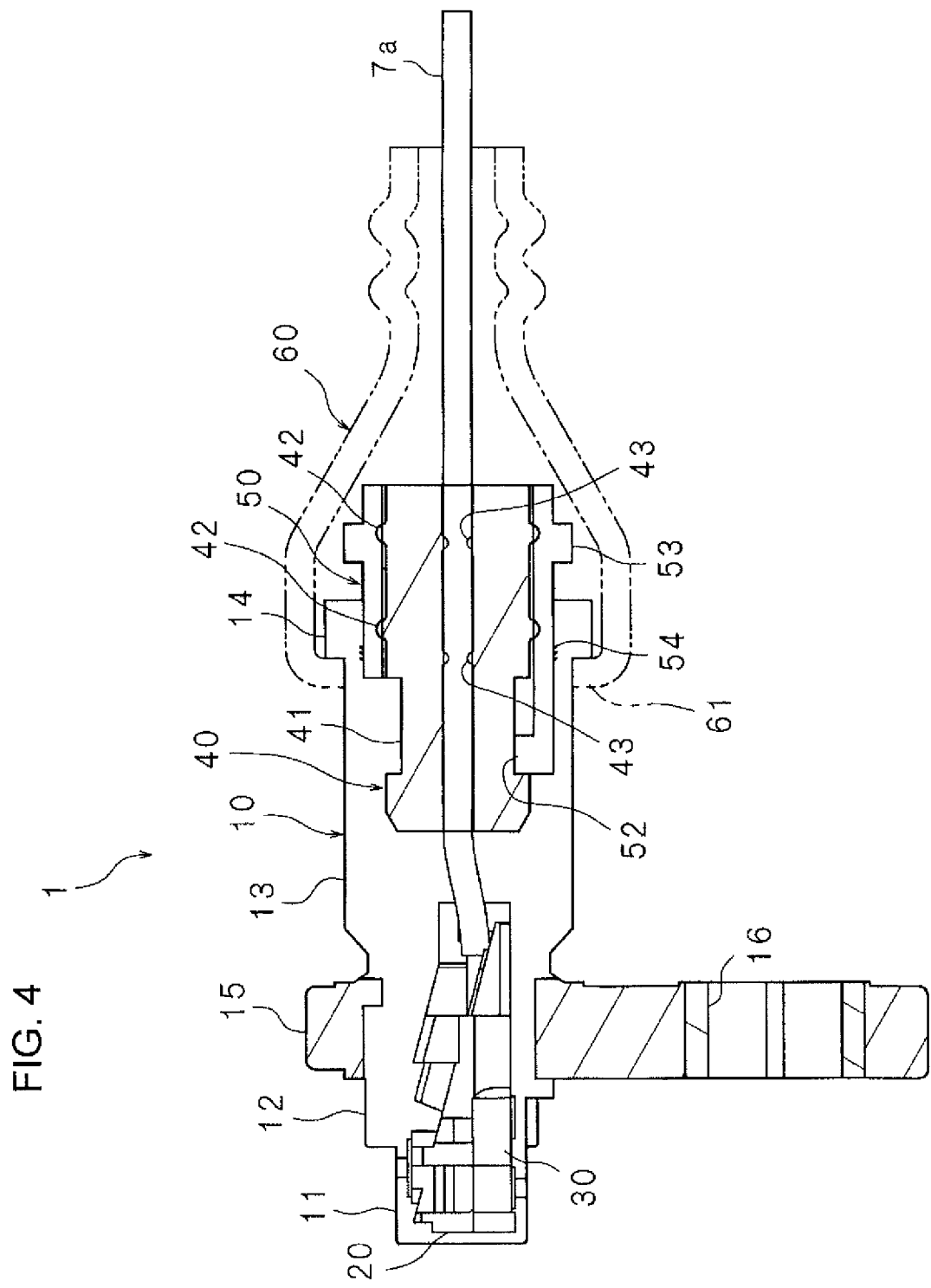
FIG. 4 is a side cross-sectional view showing the internal structure of the wheel speed sensor.

FIG. 2 is a perspective view showing the external appearance of the wheel speed sensor 1. FIG. 3 is a side view showing the external appearance of the wheel speed sensor 1. FIG. 4 is a side cross-sectional view showing the internal structure of the wheel speed sensor 1. The wheel speed sensor 1 includes an outer jacket portion 10 integrally formed of a synthetic resin. The outer jacket portion 10 has a front end portion 11 having a shape of an approximately rectangular solid with its edges chamfered, a first cylindrical portion 12 having an approximately cylindrical shape, and a second cylindrical portion 13 having an approximately cylindrical shape having a larger diameter than that of the first cylindrical portion 12. The outer jacket portion 10 is formed by connecting the front end portion 11, the first cylindrical portion 12, and the second cylindrical portion 13 in that order. It should be noted that the front end portion 11 side of the wheel speed sensor 1 will be hereinafter referred to as the front side, and the second cylindrical portion 13 side will be referred to as the rear side. A flange portion 14 is provided on the rear end portion of the outer circumferential surface of the second cylindrical portion 13. The wheel speed sensor 1 is secured to the vehicle so that the front end portion 11 opposes the rotor 9.

A fixing member 15 for fixing the wheel speed sensor 1 to the vehicle is provided on the first cylindrical portion 12 of the outer jacket portion 10. The fixing member 15 is a plate having an approximately oblong shape provided with an approximately circular through hole 16 in one longitudinal end thereof. The fixing member 15 is fixed to the outer jacket portion 10 by having the first cylindrical portion 12 penetrate a similar through hole formed in the other longitudinal end. It should be noted that the fixing member 15 may be a separately manufactured component to be fixed to the outer jacket portion 10 or may be integrally formed with the outer jacket portion 10. The wheel speed sensor 1 is fixed, for example, with a screw to an appropriate location in the vehicle via the through hole 16 of the fixing member 15.

Embedded in the front end portion 11 and the first cylindrical portion 12 of the outer jacket portion 10 is a Hall IC 20 held in a holder 30 made of a synthetic resin. Embedded in the second cylindrical portion 13 of the outer jacket portion 10 are two electrical wires 7a connected to the Hall IC 20, a waterproofing member 40 mounted on these electrical wires 7a, and a covering member 50 that covers the waterproofing member 40. It should be noted that the waterproofing member 40 and the covering member 50 are embedded in such a manner that a part of the members are exposed from the rear end surface of the outer jacket portion 10.

Figure 5A:
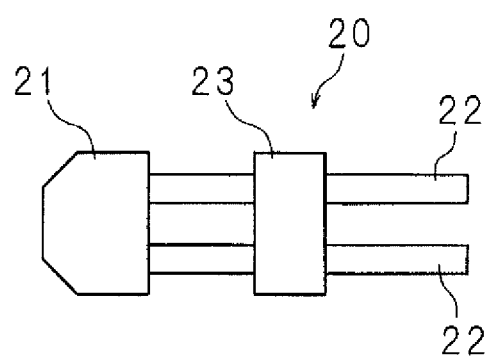
FIG. 5A is a plan view showing the configuration of the Hall IC.

FIG. 5 is a schematic view showing the configuration of the Hall IC 20. As shown in FIG. 5A, the Hall IC 20 has a magnetoelectric transducer 21 having a polyhedral outer jacket, two plate-shaped metal terminals 22 projecting from one surface of the outer jacket of the magnetoelectric transducer 21, and a capacitor 23 connected to the two metal terminals 22. The magnetoelectric transducer 21 is an element that converts the change in a magnetic field to an electrical signal and outputs the signal at the metal terminals 22. The two metal terminals 22 both have a shape of a rectangular plate and project approximately parallel from one surface of the magnetoelectric transducer 21 so that a side surface of each terminal opposes a side surface of the other terminal. The capacitor 23 has an outer jacket with a shape of an approximately rectangular solid that spans the two metal terminals 22 on one flat surface side of the two metal terminals 22.

Figure 5B:
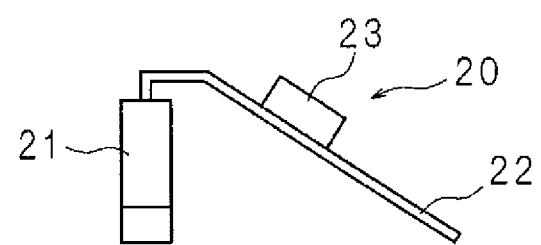
FIG. 5B is a side view showing the configuration of the Hall IC in a bent state.

In the manufacturing process of the wheel speed sensor 1, the metal terminals 22 of the Hall IC 20 are bent, and the Hall IC 20 is received and held in the holder 30. As shown in FIG. 5B, the metal terminals 22 of the Hall IC 20 are bent approximately orthogonally in the bases thereof projecting from the magnetoelectric transducer 21 and, between these bends and where the capacitor 23 is provided, the metal terminals 22 are bent in an oblique direction. These two bends are made in directions opposite to the flat surfaces on which the capacitor 23 of the metal terminals 22 is provided.

Figure 6:
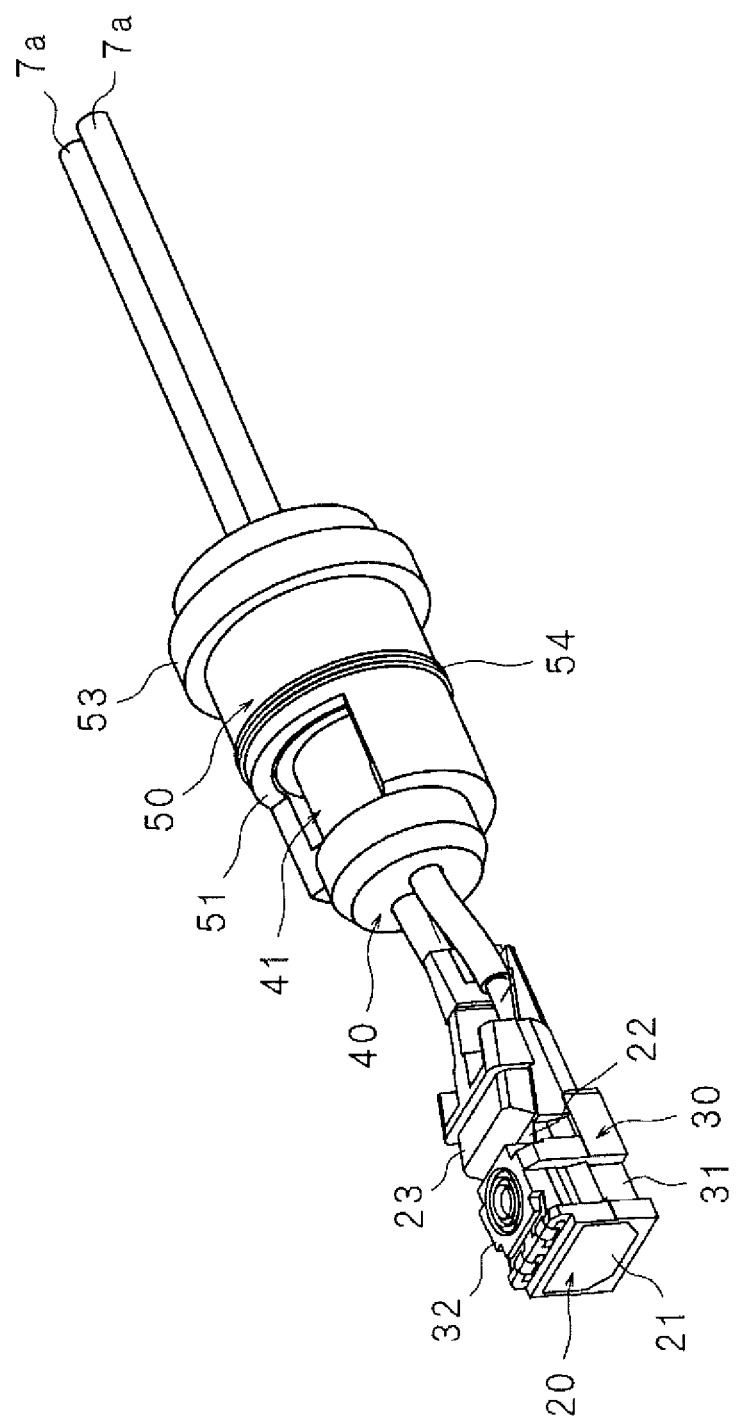
FIG. 6 is a perspective view showing the external appearance of the wheel speed sensor before the outer jacket portion is molded.

FIG. 6 is a perspective view showing the external appearance of the wheel speed sensor 1 before the outer jacket portion 10 is molded. The holder 30 is a member that holds the Hall IC 20 in the bent state shown in FIG. 5B. The holder 30 is molded with a synthetic resin or the like and composed of two members that are a base portion 31 and a lid portion 32. The Hall IC 20 is held in the holder 30 by accommodating the bent Hall IC 20 in the base portion 31 and attaching the lid portion 32. The base portion 31 and the lid portion 32 are fixed, for example, by means of engagement between hook shapes (they may also be fixed by such a method as bonding, welding, etc.). The holder 30 is provided with projections and depressions for positioning the holder with respect to a mold or a cast during the molding of the outer jacket portion 10 of the wheel speed sensor 1, and the holder 30 also serves to position the Hall IC 20.

The holder 30 is configured such that, when the holder 30 holds the Hall IC 20, the front end portions of the metal terminals 22 of the Hall IC 20 are exposed. The electric wires 7a are connected to the two metal terminals 22 of the Hall IC 20 by soldering, welding, or fastening. Each of the two electric wires 7a has a metal wire covered with a synthetic resin, and the front ends of the synthetic resin covering are removed to solder the electric wires 7a to the metal terminals 22 of the Hall IC 20. Moreover, prior to connection of the two electric wires 7a to the Hall IC 20, the waterproofing member 40 and the covering member 50 are attached to the electric wires 7a.

The waterproofing member 40 is formed in an approximately cylindrical shape and has two through holes formed therein approximately parallel in the axial direction. The two through holes in the waterproofing member 40 serve to allow the electric wires 7a to be passed through the waterproofing member 40. A groove 41 is formed fully around the outer circumferential surface of the waterproofing member 40 at a location forward of the axial center thereof. As shown in FIG. 4, two protrusions 42 are formed fully around the outer circumferential surface of the waterproofing member 40 in the rear of the groove 41. Moreover, two protrusions 43 are formed at appropriate positions fully around the inner circumferential surface of each of the two through holes of the waterproofing member 40. The protrusions 42 on the outer circumferential surface of the waterproofing member 40 serve to increase the degree of contact between the outer circumferential surface and the inner circumferential surface of the covering member 50, thereby preventing moisture or the like from infiltrating the gap between the waterproofing member 40 and the covering member 50. Similarly, the protrusions 43 on the inner circumferential surfaces of the waterproofing member 40 serve to increase the degree of contact between the inner circumferential surfaces and the electric wires 7a, thereby preventing moisture or the like from infiltrating the gaps between the waterproofing member 40 and the electric wires 7a.

The covering member 50 has an approximately cylindrical shape into which the waterproofing member 40 is inserted so as to cover the outer circumferential surface of the waterproofing member 40. A cutout 51 is formed in the covering member 50 by cutting out a portion of the front end thereof. Moreover, as shown in FIG. 4, an inward protrusion 52 is formed at the front of the inner circumferential surface of the covering member 50. The protrusion 52 engages the groove 41 of the waterproofing member 40 when the waterproofing member 40 is inserted in the covering member 50. This prevents the waterproofing member 40 from moving axially rearward during the resin molding, etc., of the outer jacket portion 10. It should be noted that forming the cutout 51 in the covering member 50 facilitates insertion of the waterproofing member 40 into the covering member 50, which is provided with the protrusion 52.

A flange portion 53 is provided fully around the outer circumferential surface of the covering member 50 in the vicinity of the rear end of the outer circumferential surface. The flange portion 53 serves to fixedly position the covering member 50 and the waterproofing member 40 with respect to the mold or the cast during the resin molding of the outer jacket portion 10. For this purpose, a part of the rear portions of the waterproofing member 40 and the covering member 50 is exposed from the rear surface of the outer jacket portion 10. Moreover, an anti-slip portion 54 composed of rows of protrusions is arranged fully around the outer circumference of the covering member 50 in an approximately axial center thereof. The anti-slip portion 54 is embedded in the outer jacket portion 10 to engage the synthetic resin that forms the outer jacket portion 10 so as to prevent the covering member 50 and the waterproofing member 40 from slipping out of the outer jacket portion 10.

Moreover, as shown in FIGS. 2-4, the wheel speed sensor 1 includes a cover member 60 mounted on the rear side of the outer jacket portion 10. The cover member 60 has an approximately tubular shape with a diameter that decreases from the front to the rear and is made of an elastic material. Formed fully around the circumference at the front of the cover member 60 is a locking portion 61 with its end bent inward. The cover member 60 is mounted by allowing the electric wires 7b to be inserted therethrough, covering the waterproofing member 40 and the covering member 50, which are exposed from the rear surface of the outer jacket portion 10, also covering the rear portion of the outer jacket portion 10, and causing the locking portion 61 to engage the flange portion 14 provided at the end of the outer jacket portion 10. When mounted, the cover member 60 is capable of alleviating impacts from outside on the waterproofing member 40, the covering member 50, and the like, which are exposed from the outer jacked portion 10, and preventing infiltration of moisture or the like.

The outer jacket member 10 of the wheel speed sensor 1 is molded, for example, with a synthetic resin, such as nylon. The holder 30 is molded, for example, with a synthetic resin, such as nylon. The waterproofing member 40 is molded, for example, using silicon. The covering member 50 is molded, for example, using nylon. The cover member 60 is molded, for example, using rubber. Moreover, for example, polyethylene is used as the synthetic resin that covers the metal wires of the electric wires 7b.

The outer jacket portion 10 of the wheel speed sensor 1 may be of a material that cannot be fused, by heating, to the waterproofing member 40 or the synthetic resin that covers the metal wires of the metal wires 7b in the molding process of the outer jacket portion 10. By contrast, the outer jacket portion 10 of the wheel speed sensor 1 may preferably be of a material that can be fused to the material of the covering member 50 by heating (they may also be fused by a method other than heating). The fusion of the outer jacket portion 10 and the covering member 50 can more reliably prevent moisture or the like from infiltrating the wheel speed sensor 1, thus more reliably preventing problems, such as the covering member 50 and the waterproofing member 40 falling out of the outer jacket portion 10.

The wheel speed sensor 1, configured as described above, can prevent moisture or the like from infiltrating the outer jacket portion 10 as the waterproofing member 40 mounted on the electrical wires 7a connected to the Hall IC 20 is configured to be embedded during the molding of the outer jacket portion 10. Moreover, the wheel speed sensor 1 includes a covering member 50 that covers the waterproofing member 40 and is configured to embed the waterproofing member 40 and the covering member 50 in the outer jacket portion 10. In this way, even if the material of the waterproofing member 40 does not easily fuse to that of the outer jacket portion 10, the covering member 50 may be of a material that easily fuses to that of the outer jacket portion 10, making it possible to fix the waterproofing member 40 in the outer jacket portion 10. Moreover, as a groove 41 is formed in the outer circumferential surface of the waterproofing member 40 and a protrusion 52 is formed on the inner circumferential surface of the covering member, the waterproofing member 40 can be prevented from moving in the axial direction by means of engagement between the groove 41 and the protrusion 52 during the resin molding process or the like, of the outer jacket portion 10.

According to the wheel speed sensor 1 configured as described above, since the waterproofing member 40 can prevent moisture or the like from entering the sensor, there is no need to provide waterproofing by fusing the synthetic resin that covers the wire harness 7 to the outer jacket portion 10 of the wheel speed sensor 1. Accordingly, the electric wires 7a of the wheel speed sensor 1 and the other electric wires 7b can be bundled into a single wire harness 7.

It should be noted that although illustrative materials for the members constituting the wheel speed sensor 1 have been mentioned in this embodiment, other materials may also be used. For example, materials such as PBT (polybutylene terephthalate) may be used for the outer jacket portion 10. Material such as PBT may be used for the holder 30. Materials, such as NBR (nitrile-butadiene rubber), may be used for the waterproofing member 40. Materials such as PBT may be used for the covering member 50. Material such as urethane may be used for the cover member 60. Moreover, the Hall IC 20 is not limited to the illustrated one; it is also possible to employ a variety of other types.

Moreover, although a part of the rear portions of the waterproofing member 40 and the covering member 50 is configured to be exposed from the outer jacket portion 10, the configuration is not limited to this. One or both of the waterproofing member 40 and the covering member 50 may be configured to be completely embedded in the outer jacket portion 10. Although a groove (depression) 41 is provided in the waterproofing member 40 and a protrusion (projection) 52 is provided on the covering member 50 and movement of the waterproofing member 40 is prevented by interlocking with the protrusion 52 of the groove 41, the configuration is not limited to this. For example, a projection may be provided on the waterproofing member 40 and a depression may be provided in the covering member 50 so that the projection and the depression engage each other. Moreover, the wheel speed sensor 1 may not include the cover member 60. Moreover, the shape of each component of the wheel speed sensor 1 shown in the drawings is only illustrative and not limited to this.

Embodiment 2

Figure 7:
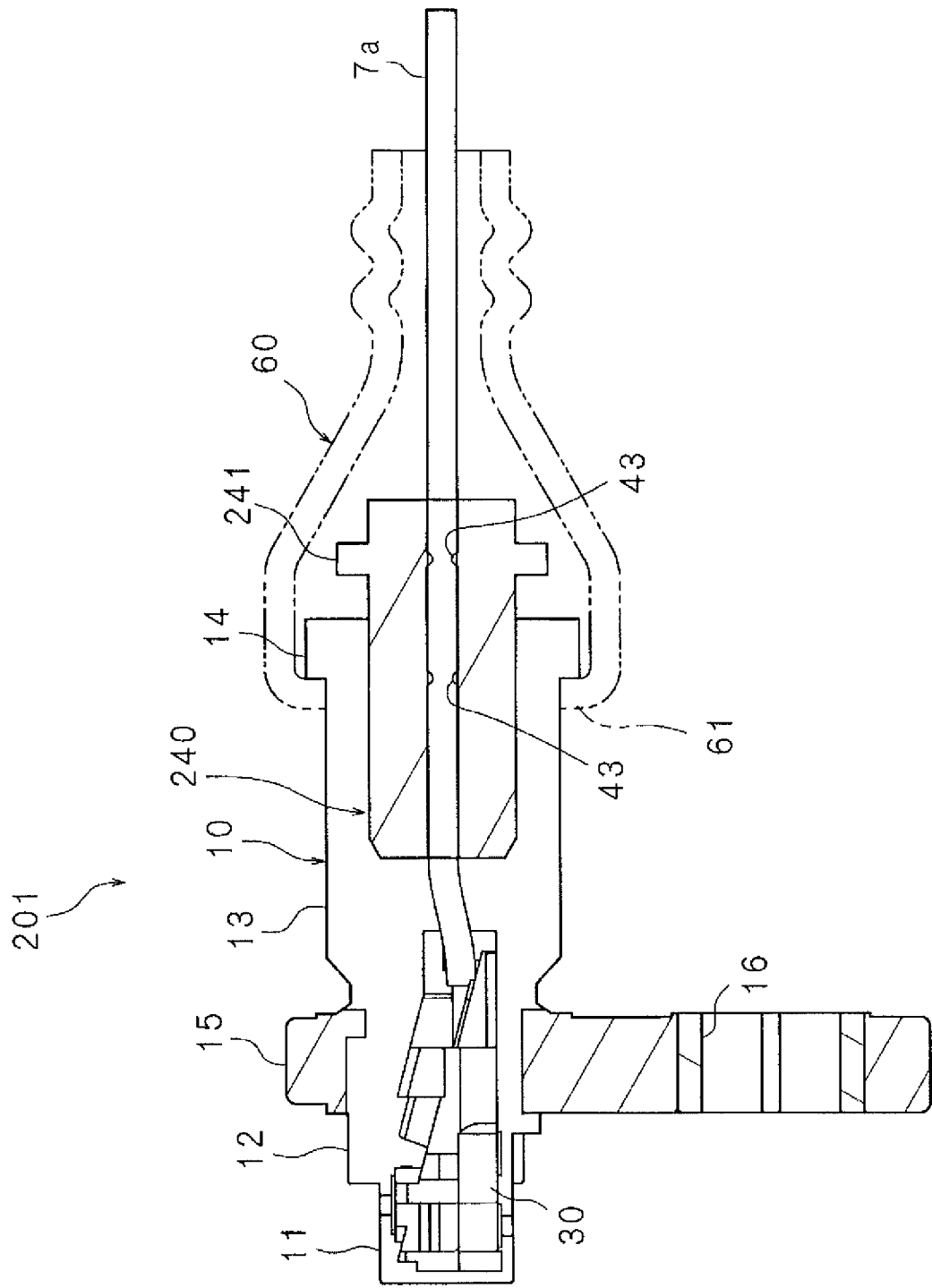
FIG. 7 is a side cross-sectional view showing the internal structure of a wheel speed sensor according to Embodiment 2.

FIG. 7 is a side cross-sectional view showing the internal structure of a wheel speed sensor 201 according to Embodiment 2. The wheel speed sensor 201 according to Embodiment 2 does not include a covering member 50. The wheel speed sensor 201 according to Embodiment 2 includes a waterproofing member 240 molded with a material that fuses to the outer jacket portion 10.

The waterproofing member 240 is formed in an approximately cylindrical shape and has two through holes formed therein approximately parallel in the axial direction so that the two electric wires 7a are passed therethrough. A flange portion 241 is provided fully around the outer circumferential surface of the waterproofing member 240 in the vicinity of the rear end thereof. The flange portion 241 serves to fixedly position the waterproofing member 240 with respect to the mold or the like during the resin molding of the outer jacket portion 10. Moreover, two protrusions 43 are formed at appropriate positions fully around the inner circumferential surface of each of the two through holes of the waterproofing member 240. The protrusions 43 serve to increase the degree of contact with the electric wires 7a, thereby preventing moisture or the like from infiltrating the gaps between the waterproofing member 240 and the electric wires 7a.

The waterproofing member 240 mounted on the electric wires 7a is embedded in the second cylindrical portion 13 of the outer jacket portion 10. The waterproofing member 240, however, is embedded in such a manner that a rear portion of the waterproofing member (including the flange portion 241) is exposed from the rear end surface of the outer jacket portion 10. A material that fuses to the outer jacket portion 10 during the molding of the outer jacket portion 10 is used as the material of the waterproofing member 240. For example, if the outer jacket portion 10 is molded with nylon, the waterproofing member 240 may be molded with nylon as well.

In the wheel speed sensor 201 configured as described above according to Embodiment 2, as the waterproofing member 240 is made of a material that fuses to the outer jacket portion 10, there is no need to provide a covering member 50 as provided in the wheel speed sensor 1 according to Embodiment 1. The wheel speed sensor 201 according to Embodiment 2 has the same waterproofing performance as the wheel speed sensor 1 according to Embodiment 1 and yet has a smaller number of components than the wheel speed sensor 1 of Embodiment 1, thus achieving a cost reduction.

It should be noted that although an illustrative material of the waterproofing member 240 has been mentioned in this embodiment, other materials may also be used. For example, materials such as urethane may be used for the waterproofing member 240. Moreover, the shape of the waterproofing member 240 is not limited to that shown in FIG. 7. Moreover, an anti-slip portion similar to the anti-slip portion 54 of the covering member 50 of Embodiment 1 may be provided around the outer circumference of the waterproofing member 240.

Moreover, as the wheel speed sensor 201 according to Embodiment 2 is otherwise configured identically to the wheel speed sensor 1 according to Embodiment 1, like parts are designated by like reference numerals and detailed explanations thereof are omitted.

Embodiment 3

Figure 8:
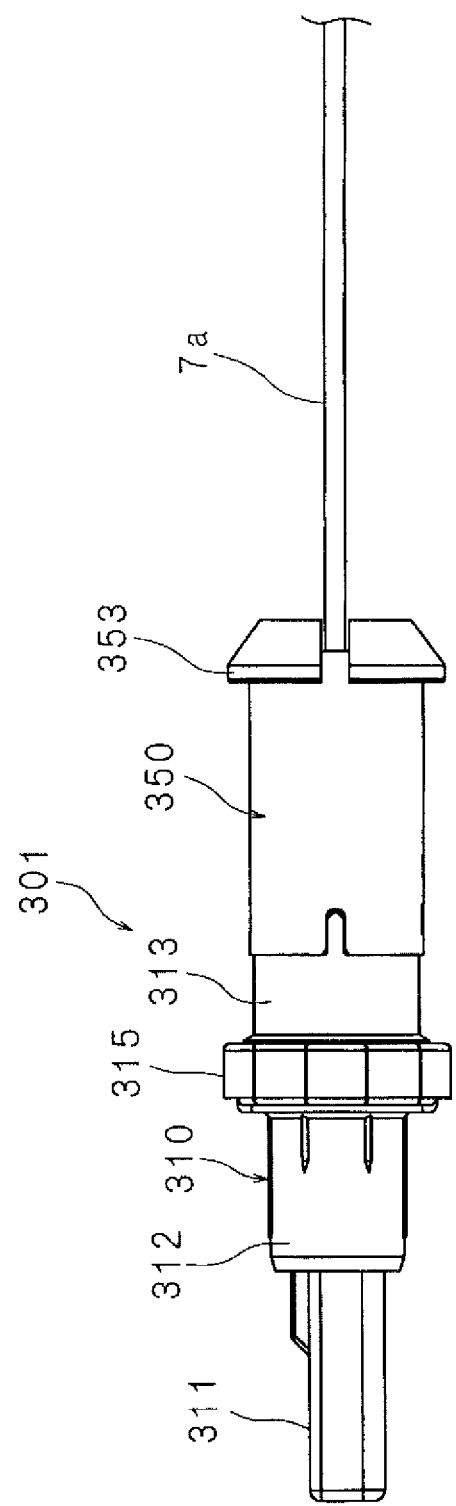
FIG. 8 is an external view of a wheel speed sensor according to Embodiment 3.
Figure 9:
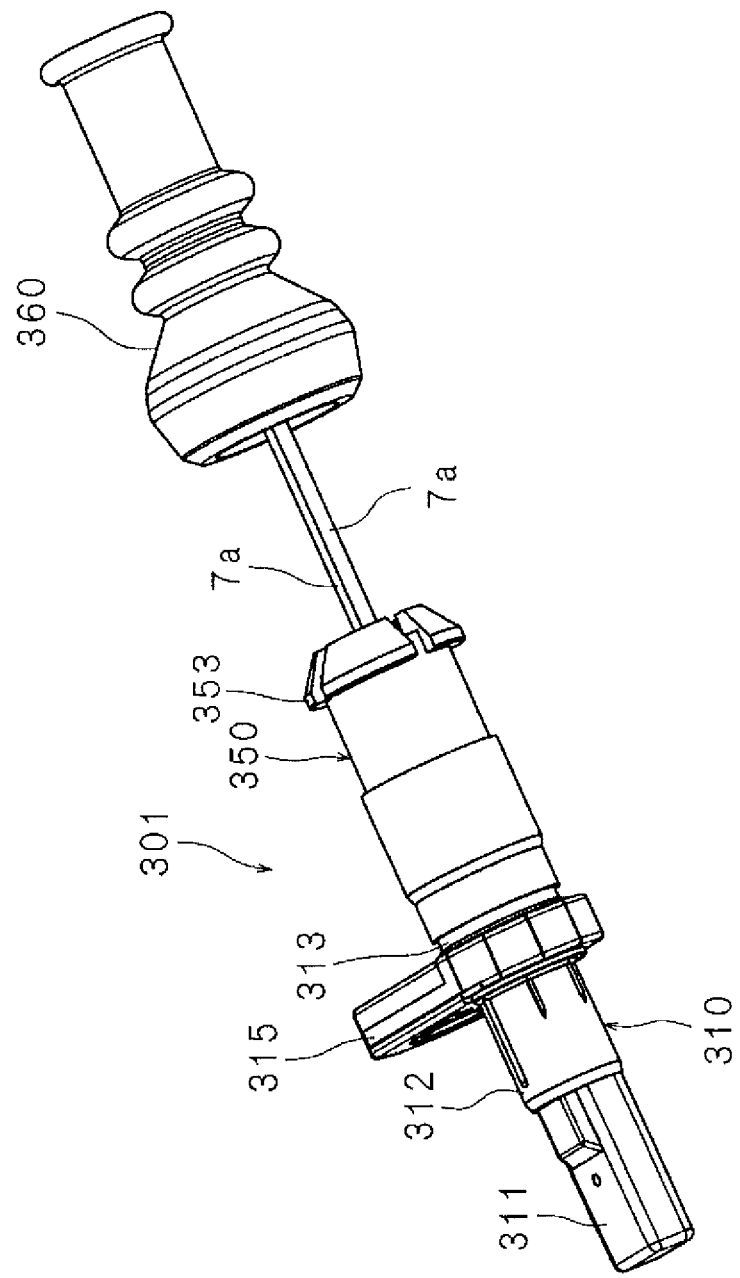
FIG. 9 is a perspective exploded view of the wheel speed sensor according to Embodiment 3.
Figure 10:
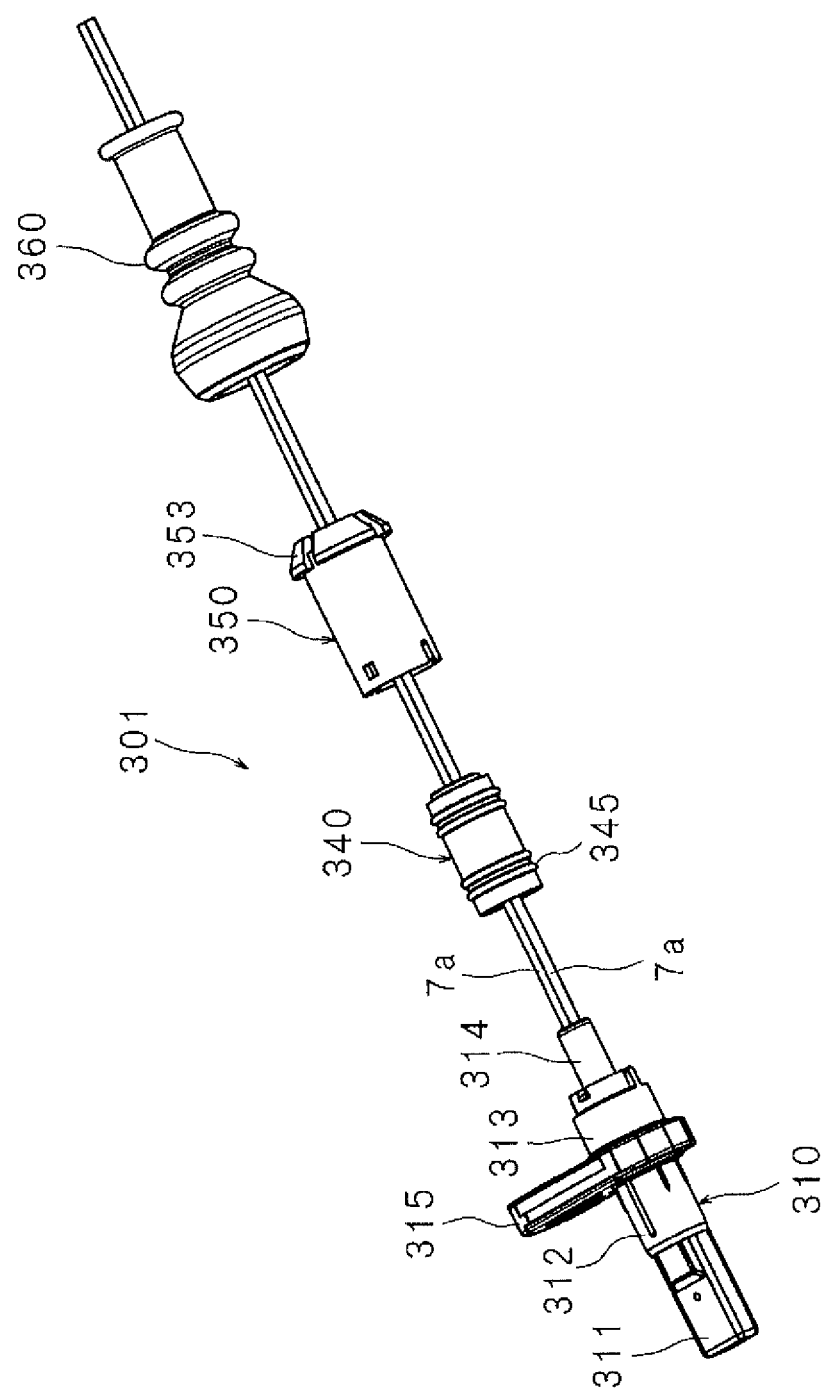
FIG. 10 is a perspective exploded view of the wheel speed sensor according to Embodiment 3.
Figure 11:
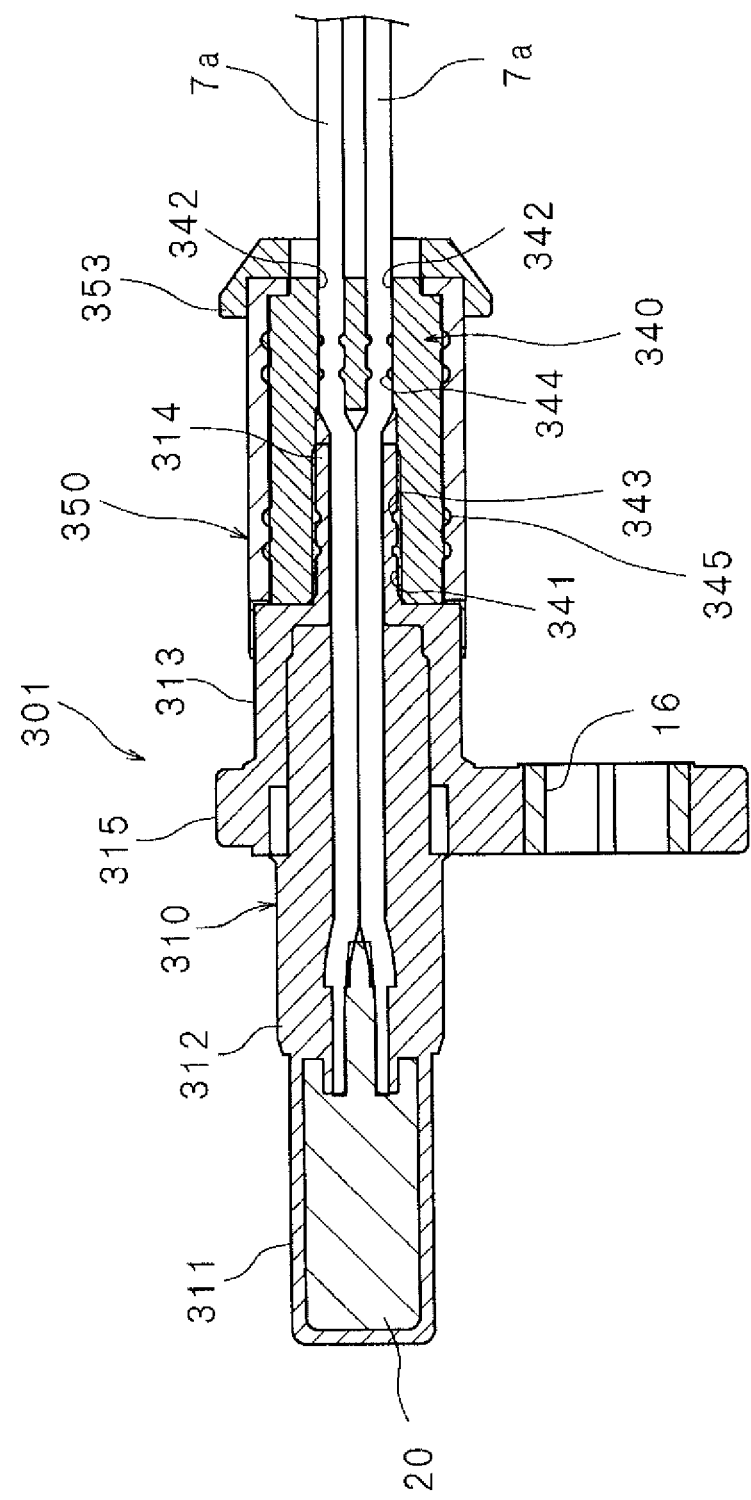
FIG. 11 is a cross-sectional view showing the internal structure of the wheel speed sensor according to Embodiment 3.

FIG. 8 is an external view of a wheel speed sensor 301 according to Embodiment 3. FIGS. 9 and 10 are perspective exploded views of the wheel speed sensor 301 according to Embodiment 3. FIG. 11 is a cross-sectional view showing the internal structure of the wheel speed sensor 301 according to Embodiment 3. The wheel speed sensor 301 according to Embodiment 3 includes an outer jacket portion 310 molded with a synthetic resin. The outer jacket portion 310 has a front end portion 311 having a shape of an approximately rectangular solid with its edges chamfered, a first cylindrical portion 312 having an approximately cylindrical shape, and a second cylindrical portion 313 having an approximately cylindrical shape with a larger diameter than that of the first cylindrical portion 312. The outer jacket portion 310 is formed by connecting the front end portion 311, the first cylindrical portion 312, and the second cylindrical portion 313 in that order.

A fixing member 315 for fixing the wheel speed sensor 301 to the vehicle is provided between the first cylindrical portion 312 and the second cylindrical portion 313 of the outer jacket portion 310. The fixing member 315 may be a separately manufactured component to be fixed to the outer jacket portion 310 or may be integrally formed with the outer jacket portion 310, or it may have any other configuration than these. In this embodiment, a first component formed by integrally molding the front end portion 311 and the first cylindrical portion 312 and a second component formed by integrally molding the fixing member 315 and the second cylindrical portion 313 are assembled into the outer jacket portion 310. The fixing member 315 is a plate having an approximately oblong shape provided with an approximately circular through hole 16 in one longitudinal end thereof. The wheel speed sensor 301 is fixed, for example, with a screw to an appropriate location in the vehicle via the through hole 16 of the fixing member 315.

Embedded in the front end portion 311 of the outer jacket portion 310 is a Hall IC 20 held in a holder 30 made of a synthetic resin. However, detailed illustration of the configurations of the Hall IC 20 and the holder 30 is omitted in FIG. 11. The configurations of the Hall IC 20 and the holder 30 may be identical to those of Embodiment 1 shown, for example, in FIGS. 5-6. Moreover, two electric wires 7a connected to the Hall IC 20 are embedded in the first cylindrical portion 312 and the second cylindrical portion 313 of the outer jacket portion 310. The two electric wires 7a connected to the Hall IC 20 are exposed to the outside from the rear end of the outer jacket portion 310.

The rear end surface of the outer jacket portion 310, i.e., the rear end surface of the second cylindrical portion 313, has an approximate circular shape, and a cylindrical projection 314 having an approximately cylindrical shape is provided at the center of the rear end surface. The cylindrical projection 314 has an approximately cylindrical shape that is thinner than the second cylindrical portion 313 and is connected approximately coaxially with the second cylindrical portion 313. The two electric wires 7a embedded in the outer jacket portion 310 are exposed to the outside from the rear end surface of the cylindrical projection 314.

A waterproofing member 340 is fixed to the rear portion of the wheel speed sensor 301 according to Embodiment 3. The waterproofing member 340 is an elastic member molded, for example, with silicon or the like having an approximately cylindrical shape. A cylindrical hole portion 341 is formed in one end (the front end) of the waterproofing member 340. The waterproofing member 340 is fixedly attached to the outer jacket portion 310 by inserting and fitting the cylindrical projection 314 of the outer jacket portion 310 in the hole portion 341. The diameter of the hole portion 341 is approximately the same as or smaller than that of the cylindrical projection 314. The axial length (depth) of the hole portion 341 is greater than the length of the cylindrical projection 314.

Two protrusions 343 are formed fully around the inner circumferential surface of the hole portion 341. The protrusions 343 of the hole portion 341 are brought into intimate contact with the outer circumferential surface of the cylindrical projection 314 when the cylindrical projection 314 of the outer jacket portion 310 is inserted into the hole portion 341. This prevents infiltration of moisture or the like through the gap between the hole portion 341 and the cylindrical projection 314. Moreover, this can more reliably fix the waterproofing member 340 to the outer jacket member 310.

Formed in the bottom surface of the hole portion 341 of the waterproofing member 340 are two through holes 342 that reach the other end (rear end) of the waterproofing member 340 approximately parallel in the axial direction. The two through holes 342 serve to pass the electric wires 7a through. Two protrusions 344 are formed fully around the inner circumferential surface of each of the through hole 342. The protrusions 344 of the through holes 342 come into intimate contact with the electric wires 7a passed through the through holes 342 to prevent infiltration of moisture or the like via the through holes 342.

Moreover, four protrusions 345 are formed fully around the outer circumferential surface of the waterproofing member 340. Of the four protrusions 345, two are provided in an axially frontward location on the waterproofing member 340 and two are provided in an axially rearward location thereof. The four protrusions 345 serve to increase the degree of contact with a covering portion 350, which will be described below.

The wheel speed sensor 301 according to Embodiment 3 includes a covering portion 350 that covers the waterproofing member 340. The covering member 350 has an approximately cylindrical shape into which the waterproofing member 340 is inserted so as to cover the outer circumferential surface of the waterproofing member 340. The covering member 350 is fixed to the outer jacket portion 310 by fitting the front end portion of the covering member 350 around the rear end portion of the second cylindrical portion 313. It should be noted that the covering member 350 may be bonded to the outer jacket portion 310 with an adhesive or the like.

The diameter of the rear opening of the approximately cylindrical covering member 350 is reduced in a stepwise manner to a smaller diameter than that of the front end thereof. In this way when fixed to the outer jacket portion 310, the covering member 350 can prevent the waterproofing member 340 from falling out of the rear end opening of the covering member 350, in which the waterproofing member 340 is accommodated. The two electric wires 7a are extended out of the high end surface of the waterproofing member 340 to the outside via the rear end opening of the covering member 350.

A flange portion 353 is provided around the outer circumferential surface of the covering member 350 in the vicinity of the rear end thereof. The flange portion 353 is provided approximately fully around the outer circumferential surface of the covering member 350 with several cutouts formed in the flange portion 353. The flange portion 353 engages the cover member 360 mounted on the rear end of the wheel speed sensor 301 so as to prevent the cover member 360 from falling off.

The cover member 360 is an elastic member formed in a cylindrical shape. The cover member 360 is mounted on the rear portion of the wheel speed sensor 301 in a manner that covers the second cylindrical portion 313 of the outer jacket portion 10 and the covering member 350. When mounted, the cover member 360 is capable of alleviating impacts from outside on the wheel speed sensor 301 and preventing infiltration of moisture or the like.

For example, to assemble the wheel speed sensor 301 according to Embodiment 3, firstly, the outer jacket portion 310 is molded by sealing the Hall IC 20, the electric wires 7a, etc, with a synthetic resin. Next, the waterproofing member 340 is fixed to the cylindrical projection 314 of the outer jacket portion 310. At this time, the waterproofing member 340 can be fixed to the outer jacket portion 310 by inserting and fitting the cylindrical projection 314 of the outer jacket portion 310 in the hole portion 341 of the waterproofing member 340.

Subsequently, the covering member 350 is mounted by covering the covering member 350 on the waterproofing member 340 from behind the wheel speed sensor 301. The covering member 350 is fixed with its front end portion fitted around the second cylindrical portion 313 of the outer jacket portion 310. Then, the cover member 360 is mounted in a manner that covers the second cylindrical portion 313 of the outer jacket portion 310 and the covering member 350 from behind the wheel speed sensor 301. The cover member 360 is mounted with the rear end portion thereof locked by the flange portion 353 of the covering member 350.

The wheel speed sensor 301 configured as described above according to Embodiment 3 employs the waterproofing member 340, which has through holes formed therein in which the electric wires 7a for connection with the Hall IC 20 are inserted; the waterproofing member 340 is fixed to the outer jacket portion 310 that seals the Hall IC 20 and portions of the electrical wires 7a with a synthetic resin to prevent moisture or the like from infiltrating the wheel speed sensor 301. The waterproofing member 340 is capable of preventing infiltration of moisture via the through holes by bringing the protrusions 344 in the through holes into intimate contact with the electric wires 7a.

Moreover, the waterproofing member 340 is fixed to the outer jacket portion 310 by means of engagement between the hole portion 341 formed in the waterproofing member 340 and the cylindrical projection 314 of the outer jacket portion 310. This facilitates the fixing of the waterproofing member 340. The protrusions 343, as being provided in the hole portion 341 of the waterproofing member 340, can be brought into intimate contact with the outer circumferential surface of the cylindrical projection 314 of the resin molded portion 310. Accordingly, infiltration of moisture or the like can be prevented and the waterproofing member 340 can be more reliably fixed to the outer jacket portion 310.

As the outer circumferential surface of the waterproofing member 340 is covered by the covering member 350, moisture or the like can be prevented from infiltrating the wheel speed sensor 301. Moreover, as protrusions 345 are formed on the outer circumferential surface of the waterproofing member 340, the protrusions 345 can be brought into intimate contact with the inner surface of the covering member 350, which covers the waterproofing member 340, making it difficult for the covering member 350 to come off the wheel speed sensor 301.

It should be noted that the same materials used for the outer jacket portion 10, the waterproofing member 40, the covering member 350, and the cover member 360 according to Embodiment 1 can also be used for the outer jacket portion 310, the waterproofing member 340, the covering member 350, and the cover member 360 according to Embodiment 3.

Moreover, as the wheel speed sensor 301 according to Embodiment 3 is otherwise configured identically to the wheel speed sensor 1 according to Embodiment 1, like parts are designated by like reference numerals and detailed explanations thereof are omitted.

LIST OF REFERENCE NUMERALS 1 wheel speed sensor
7 wire harness
7a, 7b electric wire
8 connector
9 rotor
10 outer jacket portion (resin molded portion)
11 front end portion
12 first cylindrical portion
13 second cylindrical portion
14 flange portion
15 fixing member
16 through hole
20 Hall IC (sensor element)
21 magnetoelectric transducer
22 metal terminal (terminal)
23 capacitor
30 holder
31 base portion
32 lid portion
40 waterproofing member
41 groove (depression)
42 protrusion
43 protrusion
50 cove ring member
51 cutout
52 protrusion (projection)
53 flange portion
54 anti-slip portion
60 cover member
61 locking portion
201 wheel speed sensor
240 waterproofing member
241 flange portion
301 wheel speed sensor
310 outer jacket portion (resin molded portion)
311 front end portion
312 first cylindrical portion
313 second cylindrical portion
314 cylindrical projection
315 fixing member
340 waterproofing member
341 hole portion
342 through hole
343, 344, 345 protrusion
350 covering member
353 flange portion
360 cover member

The invention claimed is:

1. A wheel speed sensor comprising:
   a sensor element including:
      a magnetoelectric transducer configured to detect a change in a magnetic field due to rotation of a rotor together with a wheel, and to convert the change into an electrical signal,
      a plurality of terminals provided on the magnetoelectric transducer, and being configured to output the electrical signal,
      a plurality of electric wires connected to the terminals, and
      a resin molded portion that seals the sensor element and a part of the electric wires with a synthetic resin, and
      a waterproofing member provided with through holes into which the electric wires are inserted, the waterproofing member being configured to prevent moisture from passing through the through holes when the electric wires are inserted, and
      the waterproofing member being fixed to the resin molded portion by an engagement provided between a hole portion formed in the waterproofing member and a part of the resin molded portion.

2. The wheel speed sensor according to claim 1, wherein the waterproofing member is an elastic member, and a plurality of protrusions is provided in the hole portion.

3. The wheel speed sensor according to claim 2, further comprising:
   a cylindrical covering member that covers an outer circumferential surface of the waterproofing member.

4. A wire harness, wherein a plurality of electric wires including the electric wires of the wheel speed sensor according to claim 2 is covered by a synthetic resin to form a single assembly.

5. The wheel speed sensor according to claim 1, further comprising:
   a cylindrical covering member that covers an outer circumferential surface of the waterproofing member.

6. The wheel speed sensor according to claim 5, wherein the plurality of protrusions is provided on the outer circumferential surface of the waterproofing member.

7. A wire harness, wherein a plurality of electric wires including the electric wires of the wheel speed sensor according to claim 6 is covered by a synthetic resin to form a single assembly.

8. A wire harness, wherein a plurality of electric wires including the electric wires of the wheel speed sensor according to claim 5 is covered by a synthetic resin to form a single assembly.

9. The wheel speed sensor according to claim 5, further comprising:
   a depression provided in an outer surface of the waterproofing member; and
   a projection provided in an inner surface of the covering member, wherein the depression of the waterproofing member and the projection of the covering member interlock in order to prevent movement of the waterproofing member.

10. A wire harness, wherein a plurality of electric wires including the electric wires of the wheel speed sensor according to claim 1 is covered by a synthetic resin to form a single assembly.

11. The wheel speed sensor according to claim 1, wherein the waterproofing member is disposed along a longitudinal length of the electric wires connected to the plurality of terminals.

\* \* \* \* \*